United States Patent [19]
Huston et al.

[11] Patent Number: 5,622,311
[45] Date of Patent: Apr. 22, 1997

[54] APPARATUS AND METHOD FOR TRANSFERRING EXHAUST FROM A TRACTOR UNIT TO A TRAILER UNIT

[75] Inventors: H. Ronald Huston, Co. Durham; Jerry F. Smith, Cleveland, both of England

[73] Assignee: Caterpillar Inc., Peoria, Ill.

[21] Appl. No.: 636,374

[22] Filed: Apr. 23, 1996

[51] Int. Cl.$^6$ .................................................. B60H 1/02
[52] U.S. Cl. .................................. 237/12.3 C; 285/302
[58] Field of Search ........................ 237/12.3 A, 12.3 C; 454/90, 186; 432/500; 285/302

[56] References Cited

U.S. PATENT DOCUMENTS

| | | | |
|---|---|---|---|
| 3,246,592 | 4/1966 | Rath | 454/186 |
| 3,335,653 | 8/1967 | Heimann | 454/90 |
| 3,611,907 | 10/1971 | Wasserman | 454/186 |

Primary Examiner—Harold Joyce
Assistant Examiner—Derek S. Boles
Attorney, Agent, or Firm—Dennis C. Skarvan

[57] ABSTRACT

A vehicle assembly includes a tractor unit having an exhaust system and a trailer unit having a duct system. The vehicle assembly further includes a hitch assembly for connecting the trailer unit to the tractor unit. Moreover, the vehicle assembly includes a first conduit having a first passageway extending therethrough, the first passageway being in fluid communication with the duct system. The vehicle assembly additionally includes a second conduit having a second passageway therethrough, the second passageway being in fluid communication with the exhaust system, wherein a portion of the first conduit and a portion of the second conduit are positioned in a coaxial orientation with respect to each other so that the first conduit is movable in an axial and rotational direction with respect to the second conduit when the tractor unit is connected to the trailer unit by the hitch assembly. A method for transferring exhaust from the tractor unit to the trailer unit is also disclosed.

17 Claims, 4 Drawing Sheets

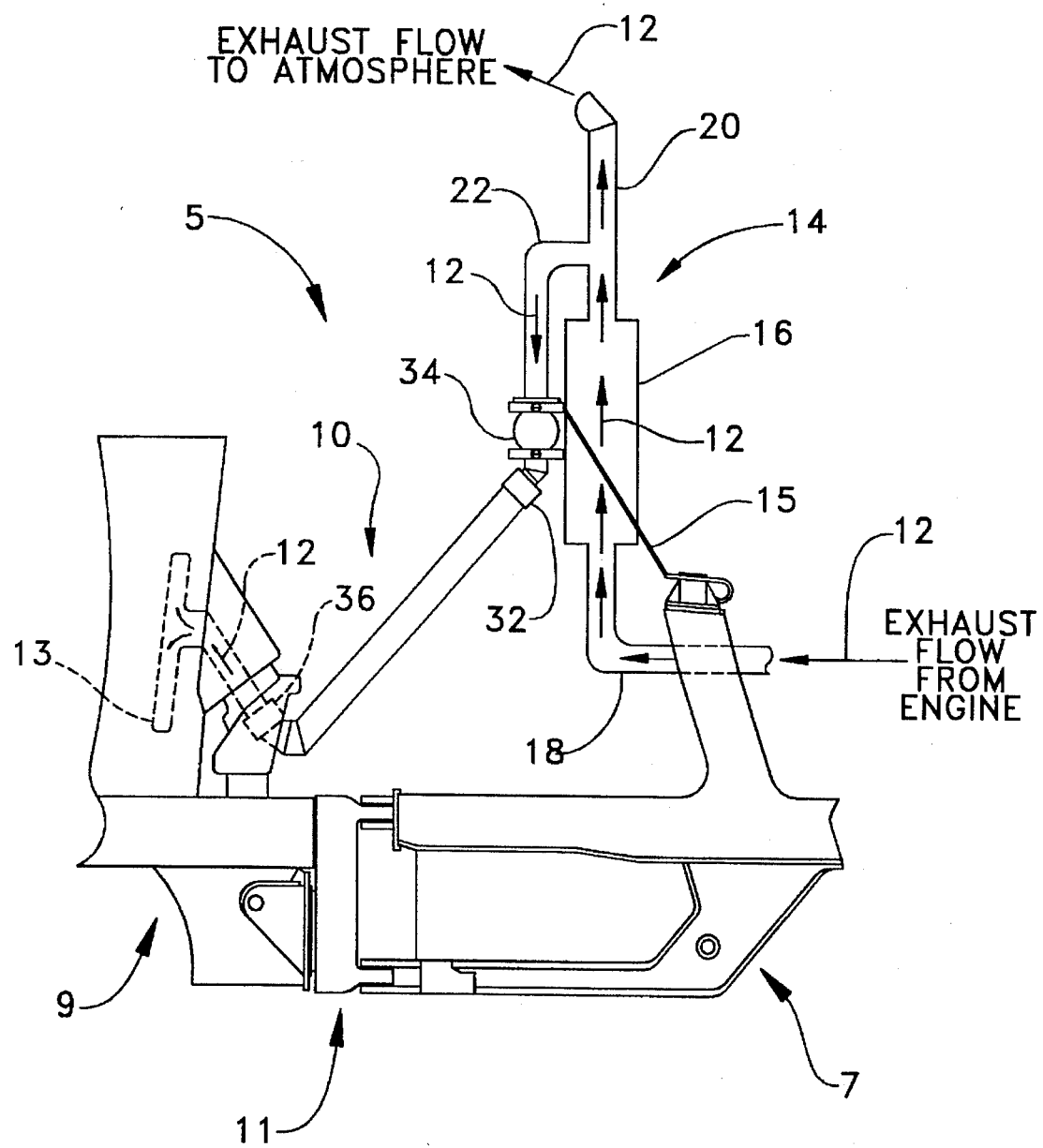
Fig_1_

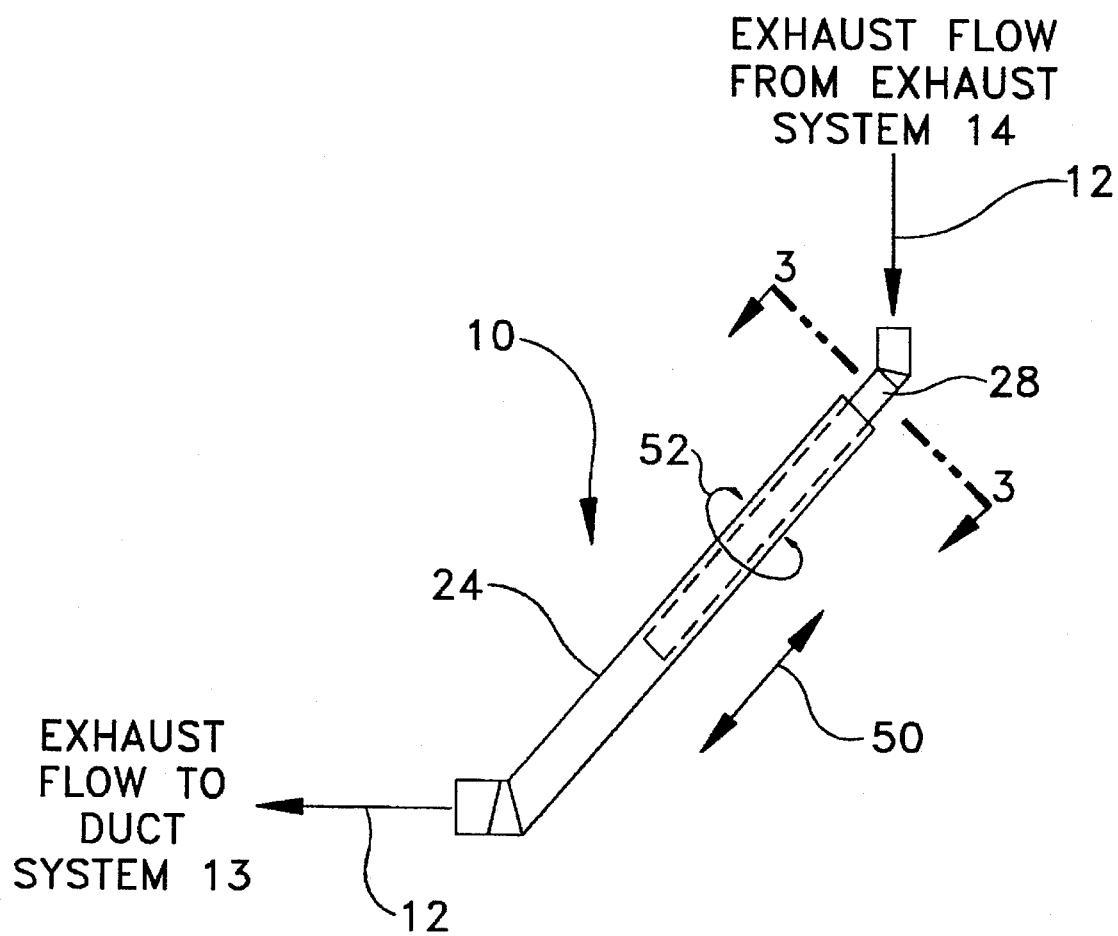

Fig_3_
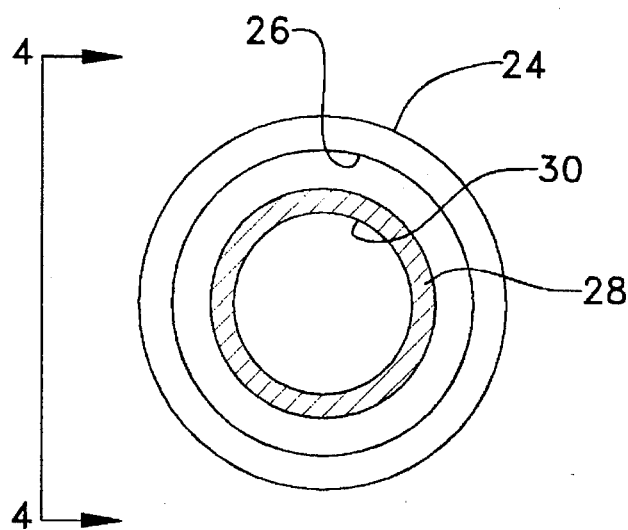
Fig_4_
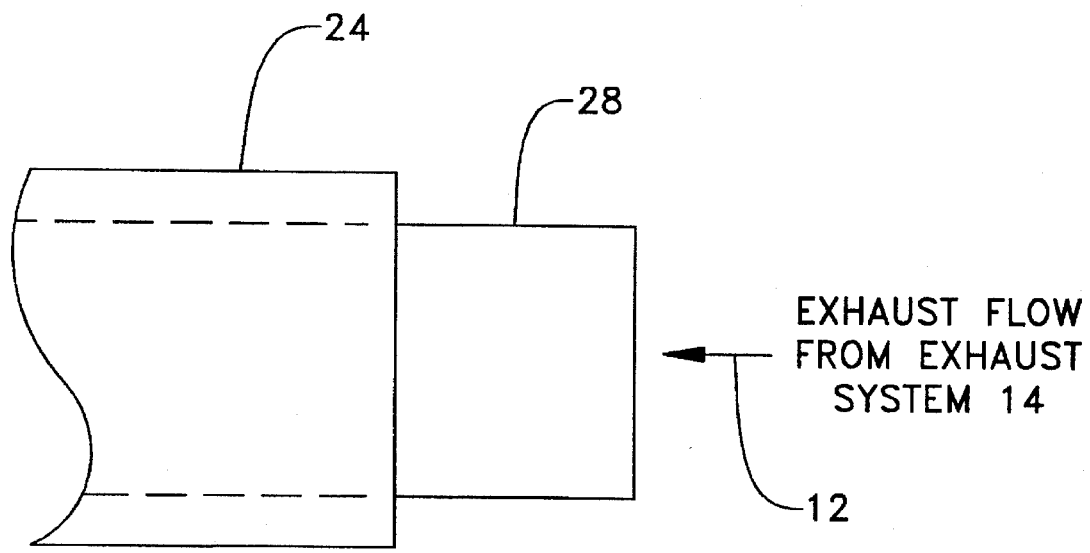

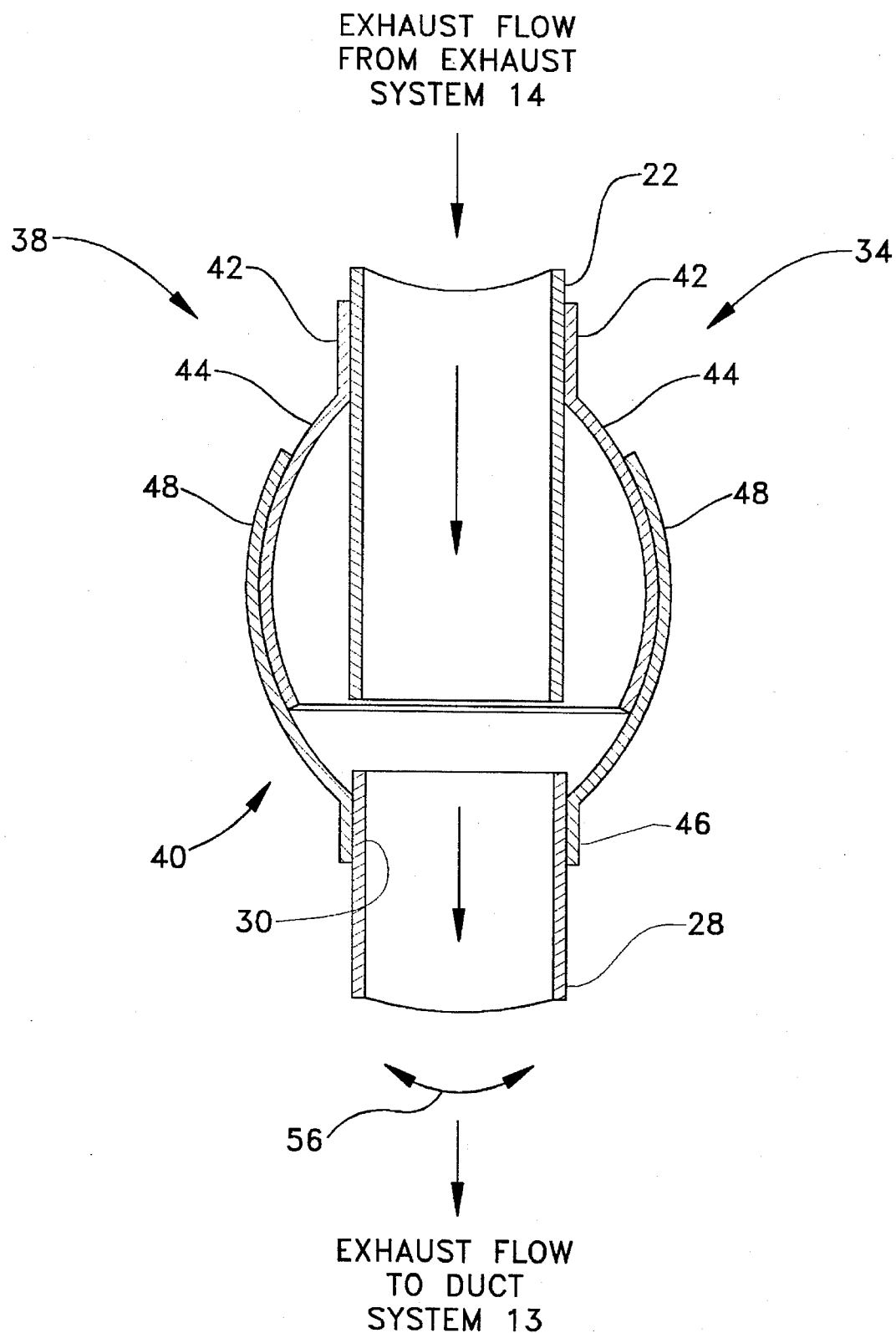
Fig_5_

APPARATUS AND METHOD FOR TRANSFERRING EXHAUST FROM A TRACTOR UNIT TO A TRAILER UNIT

BACKGROUND OF THE INVENTION

The present invention generally relates to an apparatus and method for transferring exhaust in a vehicle, and more particularly to an apparatus and method for transferring exhaust from a tractor unit of a truck to a trailer unit of the truck in order to heat various portions of the bed of the trailer unit.

A truck having a tractor unit and a trailer unit may be utilized for transporting material in the trailer unit. This type of truck is capable of unloading or ejecting the material from the trailer unit at various times. However, in certain weather conditions, the material has a tendency to adhere to the bed of trailer unit thereby resisting ejection from the trailer unit. In order to overcome this problem, some trailer units have been constructed which include a duct system for receiving a flow of exhaust generated by the engine of the tractor unit in order to heat the walls of the trailer unit. This heat inhibits the tendency of the material to stick to the trailer unit walls.

A certain type of truck which includes a duct system in its trailer unit for heating the walls thereof is an articulated dump truck. An articulated truck includes a tractor unit and a trailer unit connected to each other by a hitch assembly. The tractor unit has an engine for propelling the truck and providing power for various work functions. The tractor unit also includes an exhaust system for receiving a flow of exhaust from the engine. The trailer unit may be utilized for transporting material to and from various work locations. The trailer unit is adapted to eject the material at appropriate times.

However, an articulated truck is typically designed to be steered by bending the truck in the middle around the hitch assembly. Thus, the conduit which is used to convey the flow of exhaust from the tractor unit to the trailer unit for ultimate advancement through its duct system must be able to accommodate changes in the distance and angular relationship between the tractor unit and the trailer unit during operation of the truck. In particular, the hitch assembly allows the tractor unit to be pivoted in relation to the trailer unit in a horizontal plane (e.g. during a left or right turn). Moreover, the hitch assembly of the articulated truck typically allows the tractor unit to be moved in a rotational direction relative to the trailer unit due to the very coarse terrain in which the articulated truck is typically employed (e.g. due to scattered rocks or holes in the field).

One conduit design which has been used to accommodate the changing distance and orientation between the tractor unit and the trailer unit is a coil wound flexible steel tubing segment. However, this conduit design has the disadvantage of being relatively expensive, deteriorating quickly and possessing a rough interior surface which causes undesirable high back pressure in the exhaust system. Moreover, this conduit design further requires guide members to direct it from the tractor unit to the trailer unit.

SUMMARY OF THE INVENTION

In accordance with one embodiment of the present invention, there is provided an apparatus for transferring exhaust from a tractor unit to a trailer unit. The apparatus includes a first conduit having a first passageway extending therethrough. The apparatus further includes a second conduit having a second passageway extending therethrough, a portion of the second conduit being positioned within the first passageway of the first conduit, wherein the first conduit is movable in an axial and rotational direction with respect to the second conduit when the tractor unit is coupled to the trailer unit.

Pursuant to another embodiment of the present invention, there is provided a vehicle assembly which includes a tractor unit having an exhaust system and a trailer unit having a duct system. The vehicle assembly further includes a hitch assembly for connecting the trailer unit to the tractor unit. The vehicle assembly additionally includes a first conduit having a first passageway extending therethrough, the first passageway being in fluid communication with the duct system. Moreover, the vehicle assembly includes a second conduit having a second passageway extending therethrough, the second passageway being in fluid communication with the exhaust system, wherein a portion of the first conduit and a portion of the second conduit are positioned in a coaxial orientation with respect to each other so that the first conduit is movable in an axial and rotational direction with respect to the second conduit when the tractor unit is connected to the trailer unit by the hitch assembly.

According to yet another embodiment of the present invention, there is provided a method of transferring exhaust from an exhaust system of a tractor unit to a duct system of a trailer unit. The method includes the steps of (1) generating a flow of exhaust with the exhaust system, (2) providing a first conduit which is in fluid communication with the duct system of the trailer unit, (3) providing a second conduit which is in fluid communication with the exhaust system of the tractor unit, (4) arranging a portion of the first conduit and a portion of the second conduit in a coaxial orientation with respect to each other, (5) moving the tractor unit and the trailer unit so as to cause the first conduit and the second conduit to move in an axial direction in relation to each other, (6) moving the tractor unit and the trailer unit so as to cause the first conduit and the second conduit to move in a rotational direction in relation to each other, and (7) advancing the flow of exhaust into the duct system through the first conduit and the second conduit during the moving steps.

It is an object of the present invention to provide a new and useful apparatus and method for transferring exhaust from a tractor unit to a trailer unit.

It is another object of the present invention to provide an improved apparatus and method for transferring exhaust from a tractor unit to a trailer unit.

It is still another object of the present invention to provide an apparatus for transferring exhaust from a tractor unit to a trailer unit which is relatively inexpensive to construct.

It is another object of the present invention to provide an apparatus for transferring exhaust from a tractor unit to a trailer unit which is relatively durable.

It is moreover an object of the present invention to provide an apparatus for transferring exhaust from a tractor unit to a trailer unit which causes relatively low back pressure in the exhaust system during operation of the truck.

It is still another object of the present invention to provide an apparatus for transferring exhaust from a tractor unit to a trailer unit which is simple to construct.

The above and other objects, features, and advantages of the present invention will become apparent from the following description and attached drawings.

BRIEF DESCRIPTION OF THE DRAWINGS

FIG. 1 is a side elevational view of an apparatus for transferring exhaust from a tractor unit to a trailer unit which incorporates the features of the present invention therein;

FIG. 2 is a side elevational view of the first conduit and second conduit of the exhaust transferring apparatus of FIG. 1;

FIG. 3 is a view taken along line 3—3 of FIG. 2, with an angled end portion of the first conduit removed for clarity of description;

FIG. 4 is a fragmentary view taken along line 4—4 of FIG. 3; and

FIG. 5 is an enlarged cross sectional view of the first spherical joint of the exhaust transferring apparatus of FIG. 1.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to now to FIG. 1, there is shown a part of an articulated truck 5 having a tractor unit 7 and a trailer unit 9. Only part of the tractor unit 7 and the trailer unit 9 are shown for clarity of description. Interposed between the tractor unit 7 and the trailer unit 9 is an exhaust transferring apparatus 10 which incorporates the features of the present invention therein. The tractor unit 7 and the trailer unit 9 are connected together by a hitch assembly 11. The hitch assembly 11 allows the tractor unit 7 to pivot in a horizontal plane relative to the trailer unit 9 (e.g. during a left or right turn of the truck 5). Moreover, the hitch assembly 11 allows the tractor unit 7 to move in a rotational direction relative to the trailer unit 9 (e.g. when a wheel of the tractor unit 7 has dipped into a hole while all of the wheels of the trailer unit 9 remain on level earth). What is meant herein by the term "rotational direction" is a clockwise direction or a counter clockwise direction.

The tractor unit 7 includes an engine (not shown) which generates a flow of exhaust 12. The engine provides power to the truck 5 to propel it in a desired direction. The tractor unit 7 further includes an exhaust system 14 for receiving the flow of exhaust 12. The exhaust system 14 is supported by a bracket 15 which is connected to the tractor unit 7. The exhaust system 14 includes a muffler 16, a first exhaust pipe 18, a second exhaust pipe 20 and a third exhaust pipe 22.

The trailer unit 9 includes a duct system 13 for directing heated exhaust to various locations adjacent to the bed of the trailer unit in order to facilitate ejection of materials from the bed of the truck.

Once the flow of exhaust 12 exits the engine, it is directed into the first exhaust pipe 18 and then into the muffler 16. Upon exiting the muffler 16, the flow of exhaust divides, with some of the flow being directed to the atmosphere through the second exhaust pipe 20 and some of the flow being directed into the third exhaust pipe 22. The flow of exhaust 12 which is directed into the third exhaust pipe 22 is then directed into exhaust transferring apparatus 10. After exiting the exhaust transferring apparatus 10, the flow of exhaust 12 is then directed into the duct system 13 of the trailer unit 9.

The exhaust transferring apparatus 10 will now be described in further detail with reference to FIGS. 2–4. The exhaust transferring apparatus 10 includes a first conduit 24 having a first passageway 26 extending therethrough. The exhaust transferring apparatus 10 further includes a second conduit 28 having a second passageway 30 extending therethrough. The first conduit 24 and the second conduit 28 are each made of a metallic material such as an aluminized steel tube. Alternatively, the first conduit 24 and the second conduit 28 may be made of a heat proof, abrasion resistant, rigid, resin-type material. A portion of the second conduit 28 (shown in phantom in FIG. 2) is positioned within the first passageway 26 of the first conduit 24.

The exhaust transferring apparatus 10 additionally includes a protective collar 32 which is positioned around the first conduit 24 and the second conduit 28 as shown in FIG. 1. The protective collar covers an opening defined between an end of the first conduit 24 and an intermediate portion of the second conduit 28 so as to prevent debris from entering into the exhaust transferring apparatus 10.

The exhaust transferring apparatus 10 further includes a first spherical joint 34 and a second spherical joint (schematically shown as box 36). The first spherical joint is interposed between the second conduit 28 and the exhaust system 14, while the second spherical joint is interposed between the first conduit 24 and the duct system 13.

Since the first spherical joint 34 and the second spherical joint 36 are of similar construction, only the first spherical joint will be described in detail. Referring now to FIG. 5, the first spherical joint 34 includes a first member 38 and a second member 40 coupled together. The first member 38 includes a first collar section 42 positioned around an end portion of the third exhaust pipe 22. The first member 38 further includes a first curved section 44 which depends from the first collar section 42. The second member 40 includes a second collar section 46 positioned around an end portion of the second conduit 28. The second member 40 further includes a second curved section 48 which extends upwardly from the second collar section 46 to cover a portion of the first curved section 44 as shown in FIG. 5. The first spherical joint is held together by any suitable mechanism such as a clamp (not shown). The first spherical joint 34 allows movement of the second conduit 28 in relation to the third exhaust pipe 22 as indicated by arrow 56.

During operation of the truck 5, the tractor unit 7 will be caused to move in a variety of directions and orientations relative to the trailer unit 9. In particular, the hitch assembly 11 allows the tractor unit 7 to be pivoted in relation to the trailer unit 9 in a horizontal plane (e.g. during a left or right turn). Moreover, the hitch assembly 11 will allow the tractor unit 7 to be moved in a rotational direction relative to the trailer unit 9 when the truck 5 is operating in rough terrain (e.g. due to scattered rocks or holes in the field).

The exhaust transferring apparatus 10 accommodates the resulting changes in the distance and orientation between the tractor unit 7 and the trailer unit 9 during the above-identified operation of the truck. In particular, during a left or right turn of the truck 5, the tractor unit 7 will pivot in relation to the trailer unit 9 in a horizontal plane. In response to this pivoting action, the first conduit 24 will move in an axial direction in relation to the second conduit 28 as indicated by arrow 50 in FIG. 2. Moreover, when a wheel of the tractor unit 7 encounters a hole while all the wheels of the trailer unit 9 are located on level earth, the tractor unit 7 will move in a rotational direction relative to the trailer unit 9. In response to this rotating action, the first conduit 24 will move in a rotational direction in relation to the second conduit 28 as indicated by arrow 52 in FIG. 2.

It should be noted that the first conduit 24 and the second conduit 28 are free to move in relation to each other in both an axial direction and a rotational direction while transferring exhaust from the exhaust system 14 to the duct system 13. It should be further noted that there does not exist any substantial leakage of exhaust of out the opening defined between the end of the first conduit 24 and the intermediate portion of the second conduit 28 near protective collar 32 due to the Venturi Effect.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected,

What is claimed is:

1. An apparatus for transferring exhaust from a tractor unit through an exhaust system of said tractor unit to a trailer unit through a duct system of said trailer unit, comprising:

a first conduit having a first passageway extending therethrough and being in fluid communication with one of said duct system and said exhaust system;

a second conduit having a second passageway extending therethrough and being in fluid communication with the other of said duct system and said exhaust system, a portion of said second conduit being positioned within the first passageway of said first conduit; and wherein said first conduit is movable in an axial and rotational direction with respect to said second conduit when the tractor unit is coupled to the trailer unit.

2. The apparatus of claim 1, wherein the first conduit is in fluid communication with the duct system and the second conduit is in fluid communication with the exhaust system.

3. The apparatus of claim 1, wherein an opening is defined between an end of said first conduit and an intermediate portion of said second conduit, and further comprising:

a protective shield positioned around said first conduit and said second conduit so as to cover said opening.

4. The apparatus of claim 1, wherein:

the tractor unit includes an exhaust system which is connected to receive a flow of exhaust from an engine, the trailer unit includes a duct system, said first conduit is in fluid communication with the duct system, and said second conduit is in fluid communication with the exhaust system.

5. The apparatus of claim 4, further comprising:

a first spherical joint interposed between said first conduit and the trailer unit; and a second spherical joint interposed between said second conduit and the tractor unit.

6. The apparatus of claim 1, wherein said first conduit and said second conduit are each made of a metallic material.

7. A vehicle assembly, comprising:

a tractor unit having an exhaust system;

a trailer unit having a duct system;

a hitch assembly for connecting said trailer unit to said tractor unit;

a first conduit having a first passageway extending therethrough, said first passageway being in fluid communication with the duct system; and a second conduit having a second passageway extending therethrough, said second passageway being in fluid communication with the exhaust system, wherein a portion of said first conduit and a portion of said second conduit are positioned in a coaxial orientation with respect to each other so that said first conduit is movable in an axial and rotational direction with respect to said second conduit when said tractor unit is connected to said trailer unit by said hitch assembly.

8. The apparatus of claim 7, wherein an opening is defined between an end of said first conduit and an intermediate portion of said second conduit, and further comprising:

a protective shield positioned around said first conduit and said second conduit so as to cover the opening.

9. The apparatus of claim 7, further comprising:

a first spherical joint interposed between said first conduit and the duct system of said trailer unit; and a second spherical joint interposed between said second conduit and the exhaust system of said tractor unit.

10. The apparatus of claim 7, wherein said first conduit and said second conduit are each made of a metallic material.

11. The apparatus of claim 7, wherein the portion of said second conduit is positioned within the first passageway of said first conduit.

12. A method of transferring exhaust from an exhaust system of a tractor unit to a duct system of a trailer unit, comprising the steps of:

generating a flow of exhaust with the exhaust system;

providing a first conduit which is in fluid communication with the duct system of the trailer unit;

providing a second conduit which is in fluid communication with the exhaust system of the tractor unit;

arranging a portion of the first conduit and a portion of the second conduit in a coaxial orientation with respect to each other;

moving the tractor unit and the trailer unit so as to cause the first conduit and the second conduit to move in an axial direction in relation to each other;

moving the tractor unit and the trailer unit so as to cause the first conduit and the second conduit to move in a rotational direction in relation to each other; and advancing the flow of exhaust into he duct system through the first conduit and the second conduit during the moving steps.

13. The method of claim 12, wherein the portion of said second conduit is positioned within a passageway of said first conduit.

14. The method of claim 12, wherein an opening is defined between an end of said first conduit and an intermediate portion of said second conduit, and further comprising the step of:

positioning a protective shield around said first conduit and said second conduit so as to cover said opening.

15. The method of claim 12, wherein said first conduit and said second conduit are each made of a metallic material.

16. The method of claim 12, further comprising the steps of:

positioning a first spherical joint between the first conduit and the trailer unit; and positioning a second spherical joint between the second conduit and the exhaust system.

17. The method of claim 16, wherein the advancing step includes the step of advancing the flow of exhaust into the duct system through the first spherical joint and the second spherical joint.

* * * * *